United States Patent
Boissonneault et al.

(10) Patent No.: US 11,891,105 B2
(45) Date of Patent: Feb. 6, 2024

(54) COVER MEMBER FOR A CHILD PROTECTION SYSTEM

(71) Applicant: Evenflo Company, Inc., Miamisburg, OH (US)

(72) Inventors: Ray Boissonneault, Upton, MA (US); Kelly Chamberlin, North Attleboro, MA (US); Dorothy Chin Gerding, Miamisburg, OH (US); Jeremy Crossgrove, Revere, MA (US); Michelle M. J. Wood, Rehoboth, MA (US); Brian Whitt, Dayton, OH (US)

(73) Assignee: Evenflo Company, Inc., Miamisburg, OH (US)

( * ) Notice: Subject to any disclaimer, the term of this patent is extended or adjusted under 35 U.S.C. 154(b) by 0 days.

(21) Appl. No.: 17/981,131

(22) Filed: Nov. 4, 2022

(65) Prior Publication Data
US 2023/0278618 A1     Sep. 7, 2023

Related U.S. Application Data

(63) Continuation of application No. 17/688,336, filed on Mar. 7, 2022.

(51) Int. Cl.
*B62B 9/14* (2006.01)
*B60N 2/26* (2006.01)
*A47D 15/00* (2006.01)

(52) U.S. Cl.
CPC .............. *B62B 9/142* (2013.01); *A47D 15/00* (2013.01); *B60N 2/26* (2013.01)

(58) Field of Classification Search
CPC ............ B62B 9/14–145; B60N 2/2848; A47D 15/00; A47C 7/666; A47G 9/068
See application file for complete search history.

(56) References Cited

U.S. PATENT DOCUMENTS

| | | | |
|---|---|---|---|
| 6,224,073 B1 * | 5/2001 | Au ......................... | B62B 9/142 280/47.38 |
| 7,000,625 B2 * | 2/2006 | Dickson ............... | B60N 2/6009 135/93 |
| 7,891,732 B2 | 2/2011 | Hei et al. | |
| 8,534,751 B2 | 9/2013 | Hei et al. | |

(Continued)

OTHER PUBLICATIONS

"Cabana Infant Car Seat Shade Sebby", Uppababy, Retrieved from Internet URL: https://uppababy.com/product/cabana-infant-car-seat-shade-sebby/, accessed on Jul. 15, 2022, pp. 3.

(Continued)

*Primary Examiner* — David R Dunn
*Assistant Examiner* — Tania Abraham
(74) *Attorney, Agent, or Firm* — Shook, Hardy & Bacon L.L.P.

(57) ABSTRACT

A child protection system is provided with a cover member that is interchangeable between different child carriers, such as an infant car seat and a stroller. The interchangeable cover member protects a child occupant from sun, wind, weather, insects, germs and provides privacy. The cover member is removably coupled to an anchor member, such as a canopy, of an infant car seat when in a first position. The cover member is removably coupled to an anchor member, such as a bumper bar, of a stroller when in a second position.

19 Claims, 9 Drawing Sheets

(56) References Cited

U.S. PATENT DOCUMENTS

| | | | | |
|---|---|---|---|---|
| 8,550,548 | B2* | 10/2013 | Gibbons | B62B 9/142 297/184.13 |
| 2008/0235870 | A1 | 10/2008 | Heide | |
| 2008/0309129 | A1* | 12/2008 | Blakeman | A47C 7/666 297/184.13 |
| 2009/0096257 | A1* | 4/2009 | Gordon | B62B 9/142 297/184.12 |
| 2009/0193561 | A1* | 8/2009 | Masukawa | A47D 15/00 2/104 |
| 2012/0062001 | A1* | 3/2012 | Krasley | B62B 9/142 297/184.13 |
| 2013/0015689 | A1* | 1/2013 | Maclary | A47G 9/068 297/219.12 |
| 2014/0021751 | A1* | 1/2014 | Lang | A47C 7/66 297/184.13 |
| 2016/0198773 | A1 | 7/2016 | Anderson et al. | |
| 2018/0263373 | A1* | 9/2018 | Arias | A47C 7/666 |

OTHER PUBLICATIONS

"Pipa™ series rain cover", Nuna Pipa™ Car Seat Rain Cover | Durable & Transparent, Retrieved from Internet URL: https://nunababy.com/usa/pipa-rain-cover?color_ref=16381, accessed on Jul. 15, 2022, pp. 4.

"Stroller sunshades", Snoozeshade USA, Retrieved from Internet URL: https://snoozeshadeusa.com/collections/sun-shades-for-strollers, accessed on Jul. 15, 2022, pp. 5.

"Sweet Baby Shade Infant & Toddler", The First Baby Sun Shade of It's Kind | Sweetbabyshade—Sweet Baby Shade, Retrieved from Internet URL: https://www.sweetbabyshade.com/, accessed on Jul. 15, 2022, pp. 3.

Non-Final Office Action dated Apr. 27, 2023 in U.S. Appl. No. 17/688,336, 10 pages.

Notice of Allowance dated Sep. 20, 2023 in U.S. Appl. No. 17/688,336, 5 pages.

* cited by examiner

COVER MEMBER FOR A CHILD PROTECTION SYSTEM

CROSS-REFERENCE TO RELATED APPLICATIONS

This application is a continuation of U.S. application Ser. No. 17/688,336 filed Mar. 7, 2022 and entitled "Child Protection System" the entirety of which is all incorporated by reference herein.

BACKGROUND

Child carriers, such as infant car seats and strollers, are used for seating and transporting infants and children. Such child carriers may include a canopy or screen to shield children from sun and other elements and to provide privacy. Historically, a single screen is configured to attach to only one type of child carrier. Additionally, screens for certain types of carriers, such as a stroller, are often bulky or involve additional structural elements integrated into the screen to ensure space is maintained between the screen and a child occupant.

BRIEF DESCRIPTION OF THE DRAWINGS

The present invention is described in detail below with reference to the attached drawing figures.

SUMMARY

Figure 1:
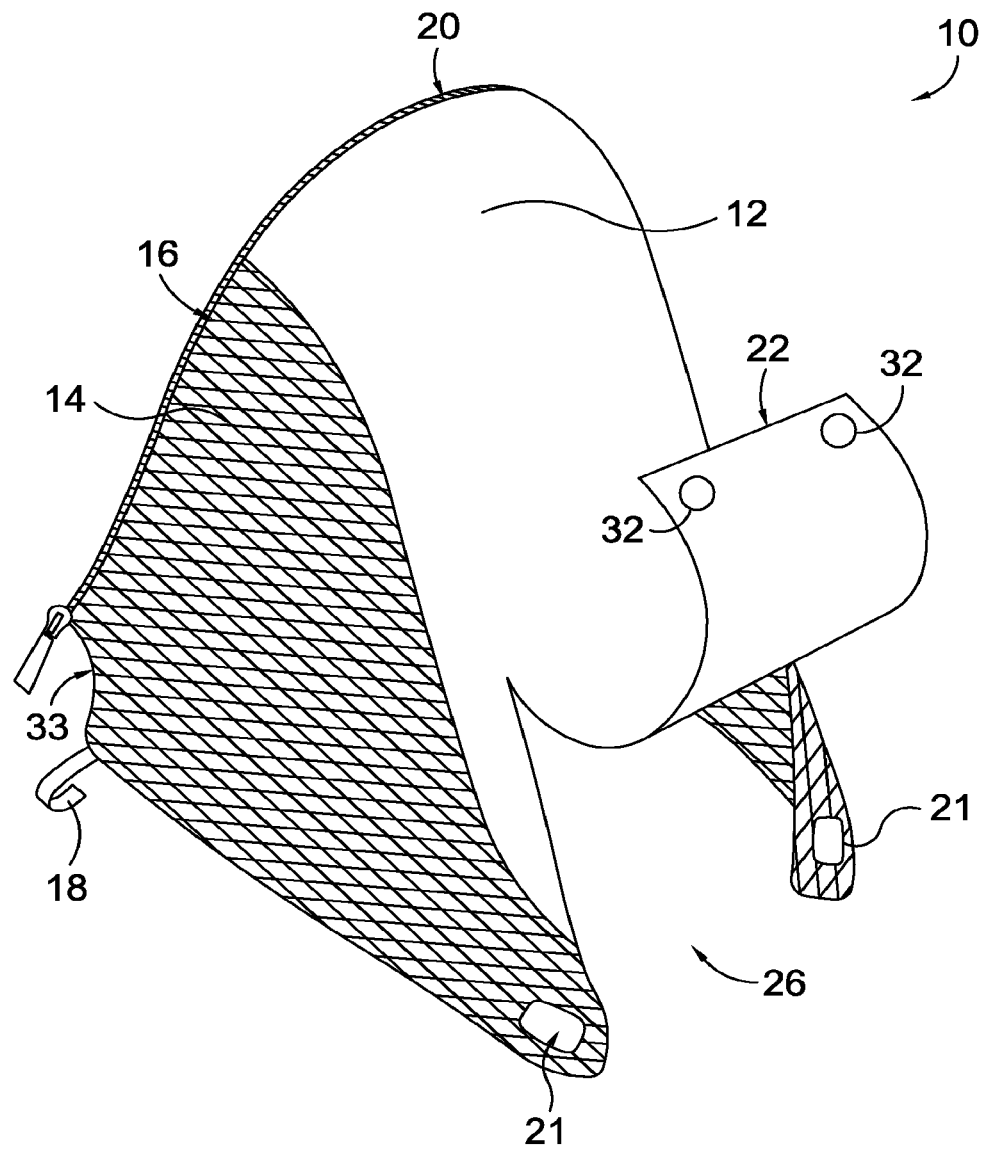
FIG. 1 is a side perspective view of a representative protective cover member in a deployed position in accordance with aspects of the disclosure.

Configurations and implementations of the present invention are directed generally to a child protection system including an interchangeable protective cover member for a child carrier. The interchangeable protective cover member is removable and may be coupled to multiple child carriers. For example, aspects herein contemplate a protective cover member that is able to be removeably coupled to a first child carrier, such as a stroller, and the same protective cover member is able to be removeably coupled to a second child carrier, such as an infant car seat, in an alternative position/configuration from the first child carrier.

In one aspect, the child protection system includes a cover member for providing protective cover for a child occupant. The cover member defines a space, at least in part, between the cover member and a child carrier, such as a first carrier and/or a second carrier. A first carrier is configured to receive a child occupant. The first carrier has a coupling element, such as a zipper, snap, button and the like, attached to a first anchor member. A second carrier is also configured to receive a child occupant. The second child carrier has a second coupling element attached to a second anchor member. The first and second anchor members of the first and second carriers are different lengths. The system further includes a third coupling element at or near a first end of the cover member. The third coupling element is operative to removably couple to the first coupling element when in a first position and/or configuration and removably couple to the second coupling element when in a second position and/or configuration. In implementations, the first child carrier is an infant car seat and the first anchor member is a canopy. In implementations, the second child carrier is a stroller and the second anchor member is a bar member extending across and spaced forward from a seat assembly of the stroller.

In one aspect, a system includes an infant car seat, a child stroller and a cover member. The infant car seat includes a seat assembly to receive a child occupant and has a first coupling element. The child stroller includes a seat assembly to receive the child occupant and has a second coupling element. The cover member provides protective cover for the child occupant. In a first position, the cover member defines a space between the cover member and the infant car seat. In a second position, the cover member defines a space between the cover member and the child stroller. The cover member has a third coupling element operative to removably couple to the first coupling element of the infant car seat when in the first position. The third coupling element is operative to removably couple to the second coupling element of the child stroller when in the second position. In implementations, the infant car seat includes a canopy that includes directly or indirectly the first coupling element of the infant car seat. In implementations, the stroller comprises a bar member extending across and spaced forward from the seat assembly of the stroller and the second coupling element of the stroller is secured to the bar member. In implementations, the canopy of the infant car seat as it extends between a first side and a second side of the infant car seat and the bar member as it extends between a first side and a second side of the stroller are different lengths.

In another aspect, a system includes an infant car seat, a child stroller, a cover member providing protective cover for a child occupant and a coupling element. The infant car seat includes a seat assembly and a canopy. The child stroller includes a seat assembly and a bar member extending across and spaced forward from the seat assembly. When in a first position, the cover member defines a space between the cover member and the infant car seat. When in a second position, the cover member defines a space between the cover member and the child stroller. The coupling element is positioned at one end of the cover member and is operative to removably couple to the canopy of the infant car seat when in the first position and removably couple to the bar member of the child stroller when in the second position. In implementations, coupling element is a single length zipper element capable of being removably coupled to the canopy and the bar member.

In yet another aspect, a system comprises a cover member for providing protective cover for a child occupant of a child carrier, a bar member attached to the child carrier and a coupling element. The cover member is configured to define a space between the cover member and a seat assembly of the child carrier. The bar member is attached to the child carrier and extends across and is spaced away from the seat assembly. The coupling element is operative to secure a first end of the cover member to the bar member. In implementations, the bar member is configured to connect with a frame of the child carrier at a first side and at a second side, wherein the second side of the frame is opposite to the first side. In implementations, the bar member includes a fabric or other textile structure covering the bar member. The fabric structure includes a coupling element that is operative to secure the first end of the cover member to the bar member via the fabric structure. The fabric structure, in an example, includes a pocket suitable for storing the cover member when not in use.

In another aspect, the child protection system includes a stroller, a cover member, a bar member and one or more coupling elements. The stroller includes a seat assembly to receive a child occupant. The cover member provides protective cover for the child occupant and defines a space between the cover member and the seat assembly. The bar member is attached to the stroller and extends across and spaced forward from the seat assembly. The one or more coupling elements are operative to secure a first end of the cover member to the bar member. In implementations, the cover member extends from the bar member and provides protective cover for a top half of the child occupant. In implementations, the bar member comprises a fabric structure that receives the bar member. The one or more coupling elements permanently secures the cover member to the fabric structure.

In another aspect, a system includes a first cover member for providing protective cover for a child occupant, a second cover member for providing protective cover for the child occupant, a bar member and one or more attachment elements. The first cover member defines a space between the first cover member and a seat assembly of a stroller. The second cover member defines a space between the second cover member and the seat assembly of the stroller. The bar member extends across and is spaced forward (e.g., projecting away) from the seat assembly. The one or more attachment elements are operative to secure a first end of the first cover member and a first end of the second cover member to the bar member. In implementations, the first cover member extends from the bar member and provides protective cover for a top portion (e.g., upper torso and head) of the child occupant. The second cover member extends from the bar member and provides protective cover for a bottom portion (e.g., lower torso and legs) of the child occupant.

DETAILED DESCRIPTION

Implementations of the invention include a child protection system having a cover member that is interchangeable between child carriers, such as an infant car seat and a stroller. The interchangeable cover member may provide protection for a child occupant from sun, wind, weather, and/or insects. The cover member may also provide the child occupant with privacy from well-meaning friends, family, or strangers. The child protection system may also limit unintended physical contact between the child occupant and third parties that can be associated with the transmission of bacteria and viruses and it may act as a barrier to the transmission of the same from others coughing, sneezing or talking.

Infant car seats and strollers are often used together as a travel system. In some instances, a stroller and a car seat that fit together are sold together as a travel system. Even when not sold together, many infant car seats can be attached to a stroller, directly or with the use of an adaptor, when a child is an infant. The stroller may have a seat assembly that can be used as the infant grows.

A cover member may be removably attached to an infant car seat when a child is an infant and then the same cover member may be used with the stroller as the child grows and transitions from the infant car seat to the stroller. In other implementations, a parent may travel with both an infant car seat and a stroller. The parent may want to use the cover member to protect the child when the child is seated in the infant car seat while traveling in a car, train and/or airplane. When the child is removed from the infant car seat and placed in a seat of the stroller, the parent may want to use the cover member to protect the child while in the stroller. Accordingly, aspects of the present disclosure include a cover member that is interchangeable with different types of carriers, such as an infant car seat and a stroller. In this way, embodiments of the cover member disclosed herein may be removed from the infant car seat and then secured to the stroller and vice versa.

Some implementations of the disclosure include a cover member that is secured to a bar member extending across a seat assembly of a child carrier, such as a stroller. As used herein, the term "bar member" refers to generally elongate structure, which may be straight, curved, angular offset segments, or have a U-shape, with ends secured to two sides of a child carrier, such as a stroller. A bar member may comprise a rigid material, such as a rigid plastic or metal, in some instances or may be a more flexible material, such as foam or other textile collections By being secured to the bar member, such as a bumper bar, the cover member may maintain a distance away (e.g., be offset) from a child occupant of the carrier without the use of a rigid or semi-rigid structure integrated into the cover member. Stated differently, the physical characteristics of the bar member are utilized for purposes of the cover member without the need for a member that is specific to the cover member. Removing the need for a rigid or semi-rigid structure that is traditionally integrated into the cover member may enable a lighter weight and more versatile cover member. For example, a cover member that utilizes structure provided by being secured to a bar member of a stroller may, once removed from the bar member of the stroller, still be usable for a cover member for an infant car seat. In some aspects, a first cover member may be attached to one side (e.g., toeward facing side) of a bar member while a second cover member may be attached to a second side (e.g., headward facing side) of a bar member. For example, a first cover member may attach to the bar member bottom side that is oriented towards a toe end of child carrier to serve as a lower-body cover member while a second cover member may attach to the bar member top side that is oriented towards a head end of the child carrier serve as an upper-body cover member. In some aspects, at least one of the cover members may be discretely stored in a pocket on or directly associated with the bar member when not in use.

Figure 2:
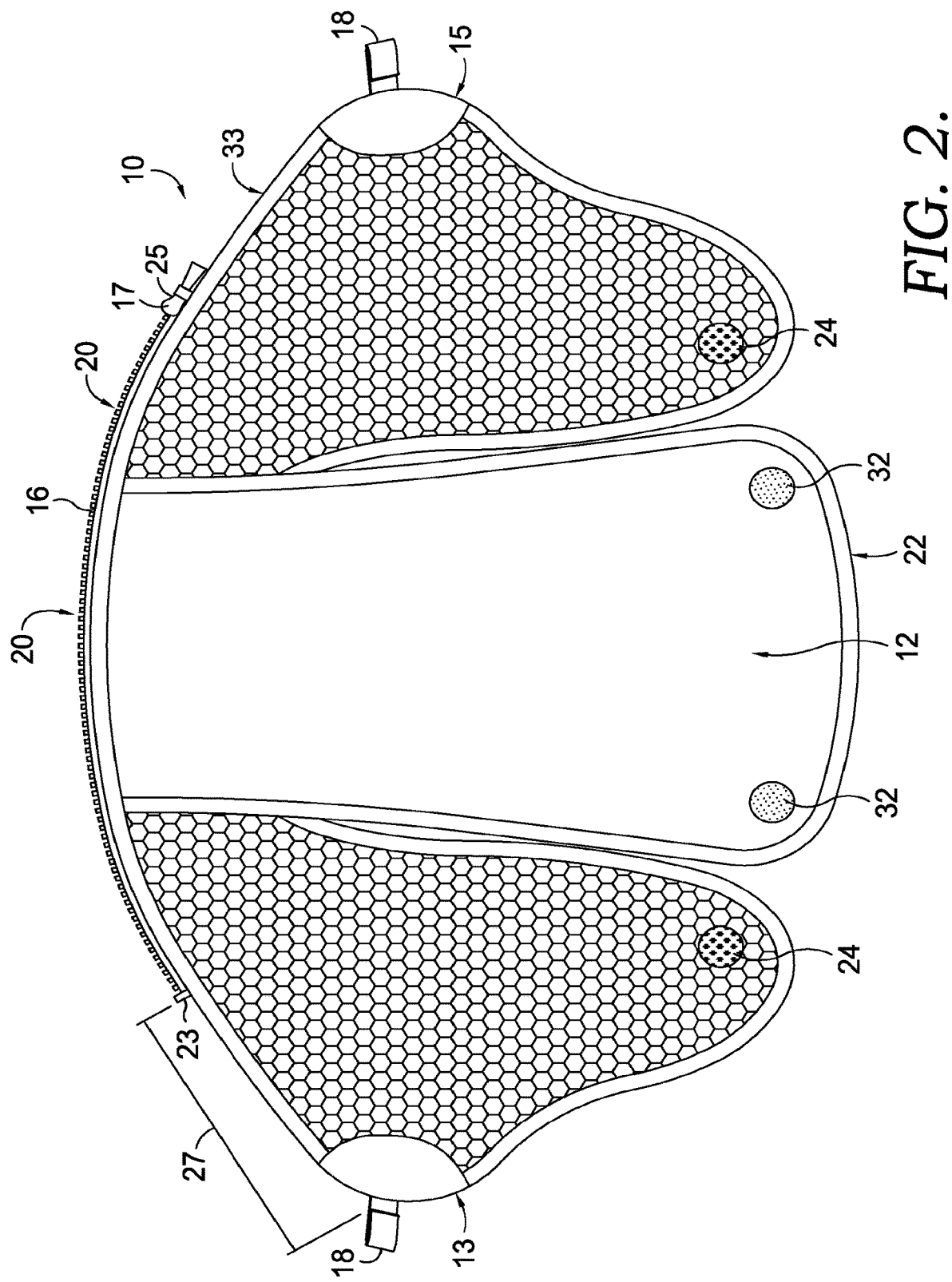
FIG. 2 is top plan view of the cover member of FIG. 1 when unattached to a child carrier in accordance with aspects of the disclosure.

Referring to FIG. 1, a cover member 10 is shown in a deployed position. In a deployed position, cover member 10 may be removably attached to a child carrier. A child carrier may be an infant car seat, child car seat, stroller, wagon or other device suitable for transporting a child or infant. A child carrier includes a seat assembly to receive a child occupant. FIG. 2 depicts an interior-facing surface of cover member 10 in a non-deployed position and unattached from a child carrier. The interior-facing surface in FIG. 2 faces toward a seat assembly or child occupant when in a deployed position.

In example implementations, cover member 10 is interchangeable between at least two different types of child carriers. For example, cover member 10 is shown deployed in a first position 28 on an infant car seat 40 in FIG. 4 and in a second position 30 on a stroller 60 in FIG. 6. Cover member 10 provides cover for a child occupant of a child carrier. Cover member 10 is capable of limiting exposure for a child occupant from sun (e.g., ultraviolet light), insects, the environment, wind, weather, and objects. Cover member 10 may also provide the child occupant with privacy and act as a barrier from transmission of germs.

Cover member 10 is made of one or more panels of fabric, which may include knit, woven, non-woven, mesh, or a combination thereof. In the configuration of FIGS. 1 and 2, cover member 10 includes a main panel 12 and two side panels 14 separated from each other by main panel 12. Main panel 12 provides a central cover to a child occupant. In some aspects, main panel 12 is comprised of a fabric that does not include elastane material, but it is contemplated that other aspects of main panel 12 may include elastane. Stated differently, it is contemplated that the main panel 12 is a lower stretch percentage than the side panels 14. Side panels 14 may be comprised of a mesh material to provide protective cover while also allowing ventilation to a child occupant. Using mesh for side panels 14 also allows parents a better view of the child occupant as compared to the non-mesh material which may be used, in an example, for the main panel 12. Stated differently, it is contemplated that the main panel 12 is formed from a first fabric having a first characteristic (e.g., porosity, stretch percentage, material composition, construction technique, ultraviolet light passivity, air permeability, and the like) and the side panels 14 are formed from a second fabric having a different first characteristic.

Cover member 10 has a first end 20, a second end 22 that is opposite first end 20, a first side 13 extending between first end 20 and second end 22, and a second side 15 opposite first side 13 and extending between first end 20 and second end 22. As described in further detail below, cover member 10 may be secured to a child carrier at both first end 20 and second end 22. Each of main panel 12 and side panels 14 may extend from first end 20 to second end 22 of cover member 10. Main panel 12 has a first end proximate the first end 20, a second end proximate the second end 22, a first side directed relative to the first side 13 and a second side directed relative to the second side 15. The main panel 12 may be separated at least partially along its sides from side panels 14 so that main panel 12 may be lifted, at least partially, from second end 22 to provide a better view of the child occupant and for ease in seating and removing the child occupant from the child carrier. While main panel 12 is lifted from second end 22, side panels 14 may remain secured to the child carrier at second end 22.

First end 20 includes coupling element 16 for removably coupling first end of the cover member 10 to a child carrier. Coupling element 16 may be a zipper element, button(s), buttonhole(s), snap(s), hook(s), hook or loop fastener(s), or other member for coupling cover member 10 to a child carrier in any combination. Coupling element 16 may include a zipper slider 17. Coupling element 16 may be coupled to corresponding coupling elements secured to anchor members of a child carrier as further described with respect to FIGS. 3-6. The term "anchor member" as used herein refers to a structure of a child carrier that is configured to be secured to a cover member. Examples of anchor members in child carriers may include canopies, hoods, bar members, trays, seat assemblies, and arm rests. In implementations, a common cover member 10 is capable of being coupled to anchor members of different lengths, such as a canopy of an infant car seat and a bar member of a stroller as further described herein. Length of an anchor member is a measure along an edge extending between two (or more) edges.

First end 20 of cover member 10 may also include additional attachment elements 18. In addition to coupling element 16, attachment elements 18 may also or alternatively secure cover member 10 to a child carrier. Attachment elements 18 may be hooks, hook and loop tape, buttons, snaps or other securing elements to additionally secure the first end 20 of cover member 10 to one or more sides of a child carrier. In some aspects, attachment elements 18 are located at or adjacent the junctures between first end 20 and first and second sides 13 and 15. For example, one attachment element 18 may be located at the juncture between first end 20 and first side 13, while another attachment element 18 may be located at the juncture between first end 20 and second side 15. Attachment elements 18 are operative to removably attach the cover member 10 to first and second sides of a child carrier as described further herein.

Attachment elements 18 may be spaced apart from coupling element 16 along the first end 20. For example, there may be a distance between a first end 23 of coupling element 16 and attachment element 18 located near first side 13 of cover member 10 and approximately the same distance between a second end 25 of coupling element 16 and attachment element 18 located near second side 15 of cover member 10. This distance 27 may be at least 2 inches in some aspects, at least 5 inches in some aspects, within a range of 2 inches to 10 inches in some aspects, and within a range of 2 inches to 12 inches in some aspects.

Second end 22 may also be removably coupled or secured to the child carrier. In some aspects, second end 22 of cover member 10 comprises attachment elements 24 for securing second end 22 of the cover member 10 to a child carrier. The attachment elements 24 may be hooks, hook and loops, buttons, hook and loop tape, snaps or other removable securing members to secure second end 22 of cover member 10. Attachment elements 24 may be positioned on an interior-facing surface of cover member 10 as shown in FIG. 2. In this example, attachment elements 24 are positioned on each side panel 14. In some aspects, main panel 12 also includes attachment elements 32. For example, attachment elements 32 may be positioned on an interior-facing surface of main panel 12. In some instances, attachment elements 32 may be secured to a child carrier similar to attachment elements 24. In other instances, attachment elements 32 may be used to secure main panel 12 side panels 14 at second end 22. For example, attachment elements 32 may be secured to attachment element 21 on an exterior-facing surface of side panels 14, which are depicted in FIG. 1. Attachment elements 32 of main panel 12 may be unattached, from the child carrier or side panels 14, to provide the child occupant with more leg room as the child grows and/or additional ventilation while first end 20 of cover member 10 may still be secured to the child carrier.

Figure 3:
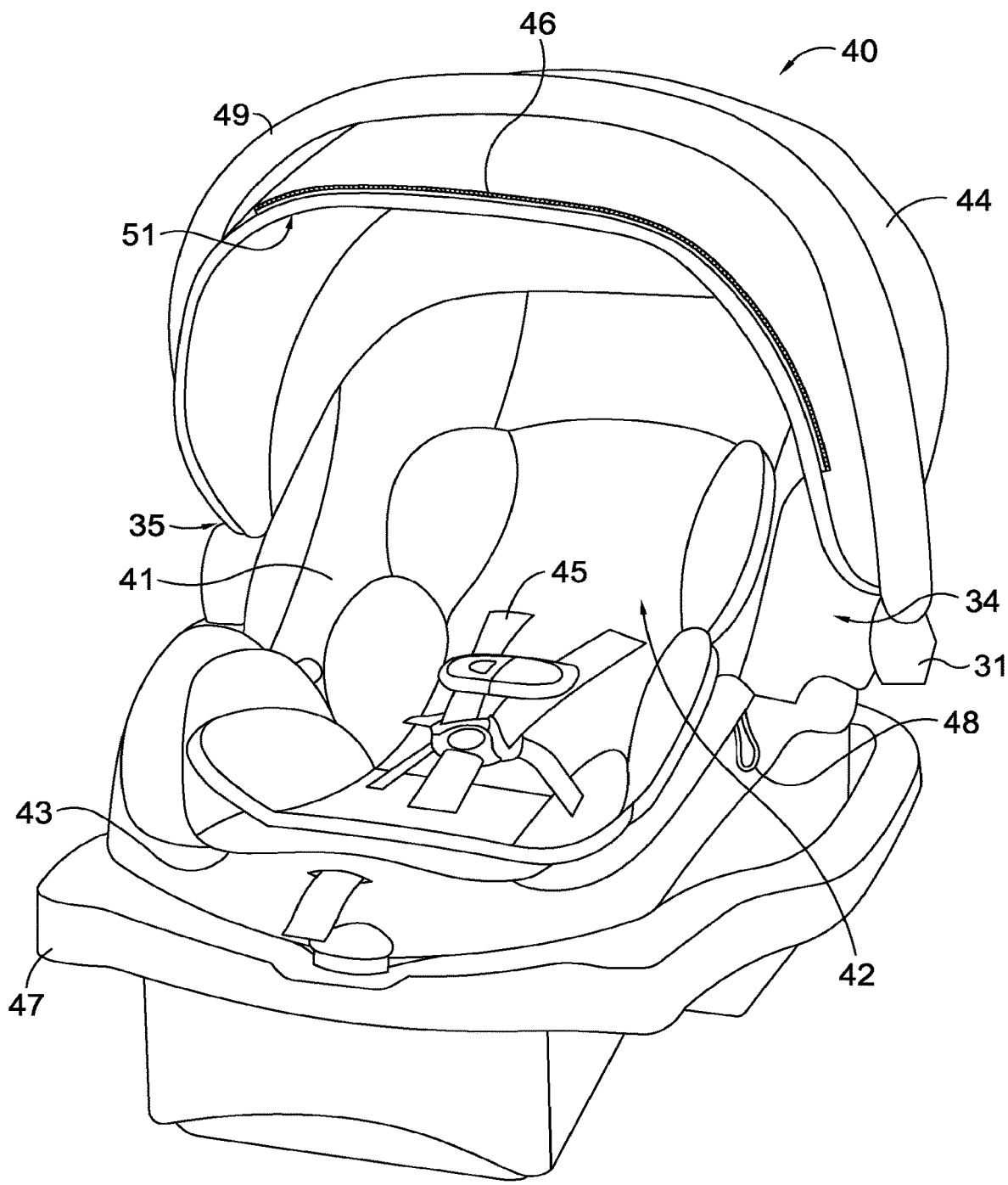
FIG. 3 is a side perspective view of an infant car seat without a cover member in accordance with aspects of the disclosure.

FIG. 3 is a representative infant car seat 40 without a cover member. Infant car seat 40 includes a seat assembly 42 for receiving a child occupant. Infant car seat 40 may include a seat back 41 and a seat bottom 43. The infant car seat 40 may include a harness 45 or other belt and buckle mechanism for retaining a child occupant in seat assembly 42. Infant car seat 40 may be shaped to be releasably connected to a vehicle, stroller, wagon, a car seat base, and high chair frame. FIG. 2 depicts infant car seat 40 secured to a car seat base 47, but it should be appreciated that infant car seat 40 may be utilized in accordance with aspects of this disclosure without connection to a base or other supporting structure. For example, infant car seat 40 may include a handle 49 such that a person can hold handle 49 and carry infant car seat 40 with the child occupant.

Infant car seat 40 may include an anchor member 44, such as a canopy or hood. Anchor member 44 further includes a coupling element 46. Coupling element 46 may be located at or adjacent a forward end 51 of anchor member 44, where the forward end 51 faces away from seat back 41 of seat assembly 42. Forward end 51 of anchor member 44 may extend from a first side 34 to a second side 35 of seat assembly 42 and may be secured to seat assembly 42 at both sides 34 and 35 either directly or via a pivot point (e.g., pivot point 31) at which anchor member may pivot to extend or retract over seat back 41 and seat bottom 43. As such, forward end 51 of anchor member has a length extending between where forward end 51 is secured to first side 34 of seat assembly 42 and where forward end 51 is secured to second side 35 of seat assembly 42.

Coupling element 46 may be a zipper element, button(s), buttonhole(s), snap(s), hook(s), hook and loop tape, or other members for coupling first end 20 of cover member 10 to infant car seat 40. In the configuration of FIG. 3, coupling element 46 is a zipper element (e.g., set of zipper teeth) secured to anchor member 44 of infant car seat 40. Infant car seat 40 further includes one or more attachment elements 48 that may be secured to attachment elements 18 on first end 20 of cover member 10 for further securing cover member 10 to infant car seat 40 as described below.

Figure 4:
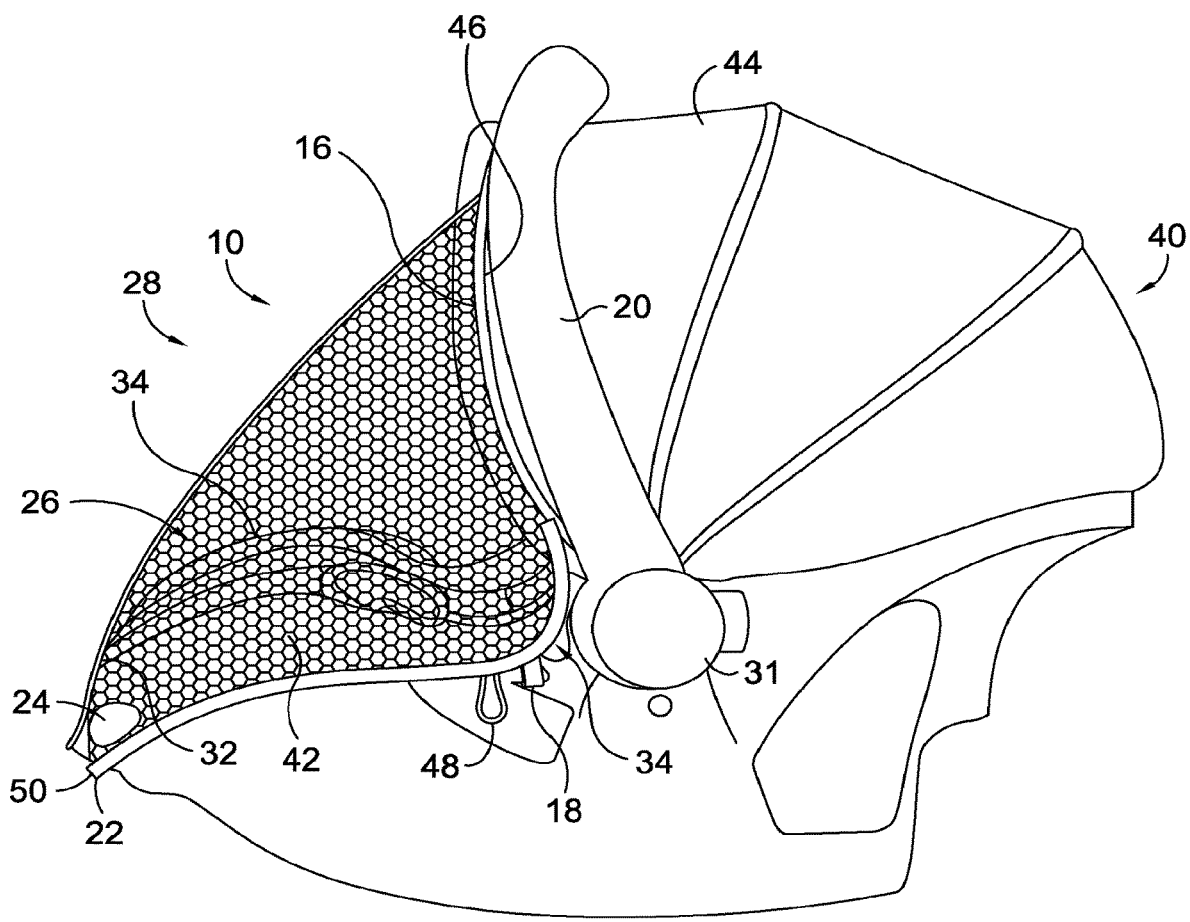
FIG. 4 is a side perspective view of the infant car seat of FIG. 3 with the cover member of FIG. 2 deployed in a first position in accordance with aspects of the disclosure.

FIG. 4 depict infant car seat 40 with cover member 10 in the deployed first position 28. In first position 28, cover member 10 is secured to anchor member 44 (e.g., canopy) of infant car seat 40. When in first position 28, cover member 10 extends from forward end 51 of anchor member 44 to a bottom portion 50 of infant car seat 40. In the first position 28, cover member 10 at least partially defines a space 26 for a child occupant between the cover member 10 and the seat assembly 42 of infant car seat 40. In the implementation depicted in FIG. 4, coupling element 16 (e.g., zipper) at first end 20 of the cover member 10 is coupled to coupling element 46 (e.g., zipper) of anchor member 44 (e.g., canopy) by zipping the two coupling elements 16 and 46 together. Coupling element 16 includes zipper slider 17 for bringing together (e.g., engaging a first set of teeth and a second set of teeth) coupling element 16 and coupling element 46 to secure cover member 10 to anchor member 44 of infant car seat 40. The configuration of FIGS. 2 and 4 depicts zipper slider 17 as residing on cover member 10. In other implementations, a zipper slider may reside on the coupling element 46 of infant car seat 40.

In the deployed position of FIG. 4, first end 20 of cover member 10 is also secured to infant car seat 40 by attachment elements 18. In the configuration of FIG. 4, attachment elements 18 are hooks residing on first end of 20 of cover member 10, and attachment elements 18 are secured to attachment elements 48 residing on infant car seat 40. In implementations, attachment elements 48 are located on both sides 34 and 35 of seat assembly 42. In example implementations, attachment element 48 may be located in front of pivot point 31 for anchor member 44. In implementations, attachment elements 48 of infant car seat 40 are loops attached to infant car seat 40 for receiving attachment elements 18 (e.g., hooks) of cover member 10. Attachment elements 18 and 48 may be hooks, hook and loop tape, buttons, snaps or other securing members to releasably securing first end 20 of cover member 10 to first and second sides 34 and 35 of infant car seat 40.

The second end 22 of cover member 10 may also be releasably coupled or secured to infant car seat 40. Attachment elements 24 secure second end 22 of the cover member 10 to bottom portion 50 of infant car seat 40. Attachment elements 24 may be hooks, hook and loop, hook and loop tape, buttons, snaps or other removable securing members to secure the second end 22 of cover member 10 as previously described with reference to FIGS. 1 and 2. Attachment elements 24 may be attached to secure cover member 10 to infant car seat 40 and passively secure a child occupant to space 26 defined by cover member 10. Attachment elements 24 may be unattached to provide the child occupant with more leg room as the child grows and/or additional ventilation.

Figure 5:
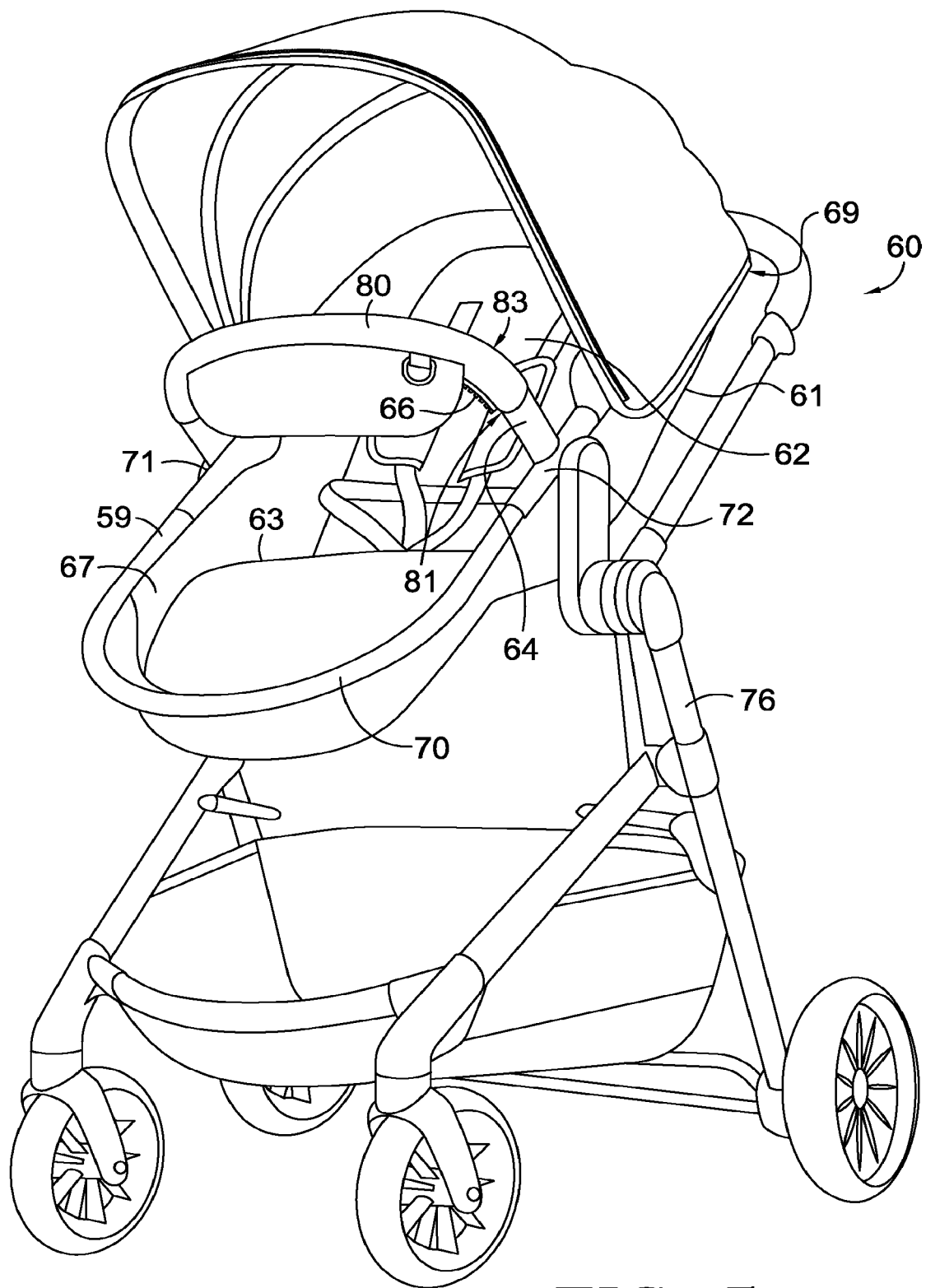
FIG. 5 is a front perspective view of a stroller without a cover member in accordance with aspects of the disclosure.
Figure 6:
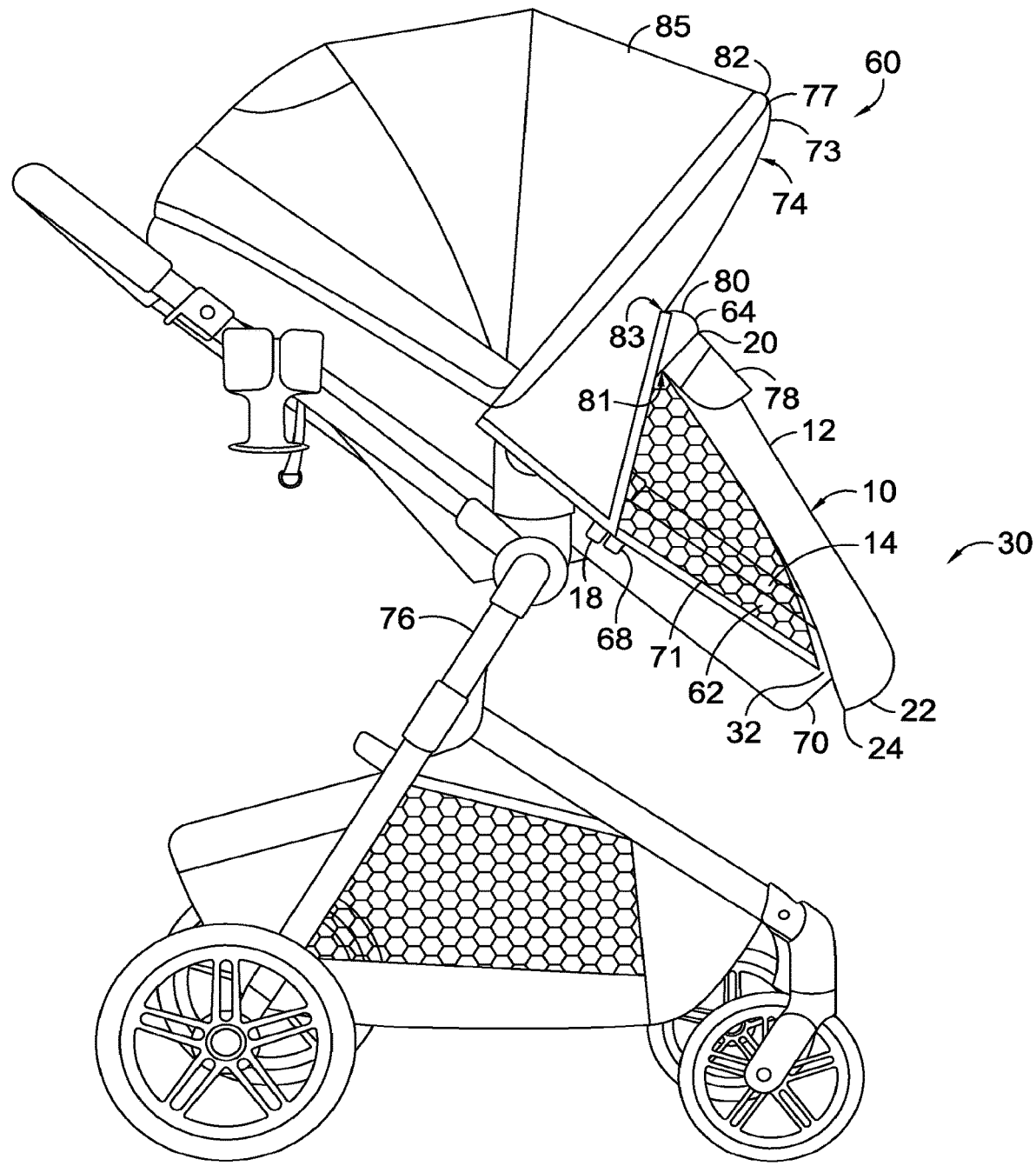
FIG. 6 is a side perspective of the stroller of FIG. 5 with the cover member deployed in a second position in accordance with aspects of the disclosure.

Example embodiments of cover member 10 is not only interchangeable between different infant car seats but is interchangeable between different types of child carriers, such as between an infant car seat (e.g., infant car seat 40) and a stroller. FIGS. 5-6 depict how cover member 10 may be utilized with a different type of child carrier, such as a stroller. FIG. 5 is a representative stroller 60 without a cover member. The term "stroller" as used herein may generally refer to a wheeled chair apparatus and may include, by way of non-limiting examples, an infant stroller, a toddler stroller, a single stroller, a multiple occupant (e.g., double) stroller, an umbrella stroller, a convertible stroller, or wagon. Stroller 60 includes a seat assembly 62 for receiving a child occupant. Seat assembly 62 may include a seat back 61, a seat bottom 63, and leg support portion 67. It should be understood that strollers may have various configurations and that, in some instances, seat assembly 62 may convert to a bassinet or such that leg support portion 67 such that seat back 61, seat bottom 63 and/or leg support portion 67 may be utilized to support other portions of a child occupant. Seat assembly 42 further includes a top portion 69, a bottom portion 70, a first side 72 generally extending between top and bottom portions 69 and 70, and a second side 71 opposite first side 72 and generally extending between top and bottom portions 69 and 70.

Seat assembly 62 is connected to a frame 76 of stroller 60. The configuration of FIG. 5 depicts frame 76 forming at least part of front and back legs, and stroller 60 further includes wheels connected to the legs of frame 76. The configuration of FIG. 5 further depicts stroller 60 having a handle bar connected to frame 76 for use by a person to push or pull stroller 60 and the child occupant. The stroller 60 may include a harness or other belt and buckle mechanism for retaining the child occupant in seat assembly 62. Additionally, seat assembly 62 includes a frame 59. In configurations in which seat assembly may be removed or converted for different modes, frame 59 of seat assembly 62 may be attached to frame 76 of stroller 60. In other aspects, frame 59 of seat assembly 62 may be part of frame 76 of stroller 60.

Stroller 60 further includes an anchor member 64. In example implementations, including the one depicted in FIG. 5, anchor member 64 is in the form of a bar member (a bumper bar, napper bar and/or child tray) secured to frame 59 of seat assembly 62, which may be either removable from or integral to frame 76 of stroller 60. In the configuration of FIG. 5, anchor member 64 is connected with frame 59 of seat assembly 62 at first side 72 and at second side 71. Anchor member 64 extends between first side 72 and second side 71 such that anchor member 64 extends across and is spaced away from seat assembly 62 of stroller 60. In the configuration of FIG. 5, anchor member 64 extends across the width of seat assembly 62. Anchor member 64 extends across and is spaced forward from a lower back support portion of the stroller 60 such that it may be positioned generally across the waist of a child occupant when a child occupant is seated in stroller 60.

Anchor member 64 further includes a coupling element 66 that is operative to removably secure first end 20 of the cover member 10 to anchor member 64. In the configuration of FIG. 5, anchor member 64 includes a bar member (e.g., bumper bar) enclosed within a fabric structure 80. Fabric structure 80 is formed from one or more pieces of fabric with two ends sewn together to create a passageway for receiving anchor member 64. In this configuration, coupling element 66 is attached to fabric structure 80. Coupling element 66 may be a zipper element, button, buttonhole, snap, hook, hook or loop tape, or other member for removably coupling cover member 10 to anchor member 64 of stroller 60.

FIG. 6 depicts stroller 60 with cover member 10 deployed. In this deployed second position 30, cover member 10 is secured to anchor member 64 of stroller 60. Specifically, coupling element 66 is releasably secured to coupling element 16 of cover member 10. In this example, coupling element 16 comprises a set of zipper teeth, and coupling element 66 comprises a corresponding set of zipper teeth that is configured to mate with coupling element 16. In this way, coupling element 16 of cover member 10 is configured to be releasably secured to coupling elements on at least two different types of child carriers (e.g., infant car seat 40 and stroller 60). Particularly, coupling element 16 of cover member 10 is releasably secured to anchor member 44 in the form of a canopy on infant car seat 40 in a first use and is releasably secured to anchor member 64 in the form of a bumper member on stroller 60 in a second use.

In example implementations, anchor member 44 (e.g., canopy) and anchor member 64 (e.g., bumper bar) may have different lengths. For example, if stretched out flat, forward end 51 of anchor member 44 may have a first length between a portion secured to first side 34 of seat assembly 42 and second side 35 seat assembly 42 of infant car seat 40. Because forward end 51 of anchor member 44 extends up and over the width of seat assembly 42, the first length is greater than the width of seat assembly 42 between first side 34 and second side 35. Anchor member 64 may have a second length between first side 72 and second side 71 of seat assembly 62 of stroller 60. In some configurations, such as the one shown in FIG. 5, anchor member 44 extends outward away from seat assembly 62 such that the second length may be greater than the width of seat assembly 62. Additionally, first length of anchor member 44 of infant car seat 40 may be different than the second length of anchor member 64 of stroller 60. In the example depicted in FIGS. 3-6, the first length of anchor member 44 of infant car seat 40 is greater than the second length of anchor member 64 of stroller 60. However, to ensure coupling element 16 may be properly secured to both coupling element 36 of infant car seat 40 and coupling element 66 of stroller 60, coupling elements 36 and 66 may generally have the same length, which may correspond to the length of coupling element 16 of cover member 10.

In example embodiments, coupling element 66 (as well as coupling element 16) may generally have the same length as anchor member 64 so that coupling element 66 may be used to secure cover member 10 across the entire length of anchor member 64. As such, coupling element 46 of infant car seat 40 may have a length that is less than the first length of anchor member 44 (e.g., canopy). To ensure cover member 10 is secured fully to both sides 34 and 35 of infant car seat 40, additional attachment elements 18 on cover member 10 may be used to secure cover member 10 to sides 34 and 35 of infant car seat 40 as described with respect to FIGS. 1-4.

Additionally, attachment elements 18 may be spaced apart from respective ends of coupling element 16 as previously described. As such, cover member 10 may include elastic sections 33 (shown in FIGS. 1 and 2) each extending between an end (i.e., first end 23 or second end 25) of coupling element 16 and attachment element 18. The elastic sections 33 between coupling element 16 and attachment element 18 may enable cover member 10 to stretch to secure to sides 34 and 35 of infant car seat 40 such that cover member 10 may be used with child carriers having different canopy lengths.

In this example, cover member 10 extends from anchor member 64 to bottom portion 70 of seat assembly 62 of stroller 60 such that cover member 10 may serve as a protective cover for a lower portion of a child occupant. In the configuration of stroller 60, cover member 10 is secured to bottom portion 70 of seat assembly 62 of stroller 60. In the second position 30, cover member 10 defines a space between seat assembly 62 of stroller 60.

In the second position 30 of FIG. 6, first end 20 of cover member 10 is also secured to stroller 60 by attachment elements 18 similar to attachment elements 18 of cover member 10 being secured to infant car seat 40 when in the first position 28. The attachment elements 18 of cover member 10 may be releasably secured to attachment elements 68 on stroller 60. In implementations, attachment elements 68 of stroller 60 are located on first and second sides 72 and 71 of seat assembly 62. In implementations, attachment elements 68 are loops for receiving attachment elements 18 (e.g., hooks) of cover member 10. Attachment elements 18 and 48 may be hooks, hook and loop tape, buttons, snaps or other securing members to additionally secure first end 20 of cover member 10 to first and second sides 72 and 71 of stroller 60.

Second end 22 of cover member 10 may also be coupled or secured to stroller 60. Similar to how attachment elements 24 are secured to bottom portion 50 of infant car seat 40 in first position 28, attachment elements 24 may be used to secure second end 22 of cover member 10 to bottom portion 70 of seat assembly 62 in second position 30. Attachment elements 24 may be hooks, hook and loop, buttons, hook and loop tape, snaps or other removable securing members to secure second end 22 of cover member 10 to stroller 60. As previously described, in some implementations, attachment elements 24 of cover member 10 may be secured directly to a fabric covering of stroller 60. For example, at least part of a bottom portion 70 of seat assembly 62 may be made with a tricot fabric that is generally configured to receive a hook and loop fastener, attachment elements 24 of cover member 10 may be hook and loop fasteners that couple directly to tricot fabric of stroller 60. Attachment elements 24 may be selectively unattached to provide the child occupant with more leg room as the child grows and/or additional ventilation.

While a single cover member, such as cover member 10 may be sufficient to fully cover and protect a child occupant in infant car seat 40, child occupants in stroller 60 may be bigger and, therefore, not fully protected by a single cover member. Some aspects of the disclosure include two cover members secured to stroller 60. Cover member 10 may protect a lower portion of a child occupant, while a second cover member 74 may protect an upper portion of the child occupant. Second cover member 74 may comprise one or more panels of fabric, which may be knit, woven, non-woven, mesh, or a combination thereof. In one example, second cover member 74 is one panel of mesh material.

Figure 7:
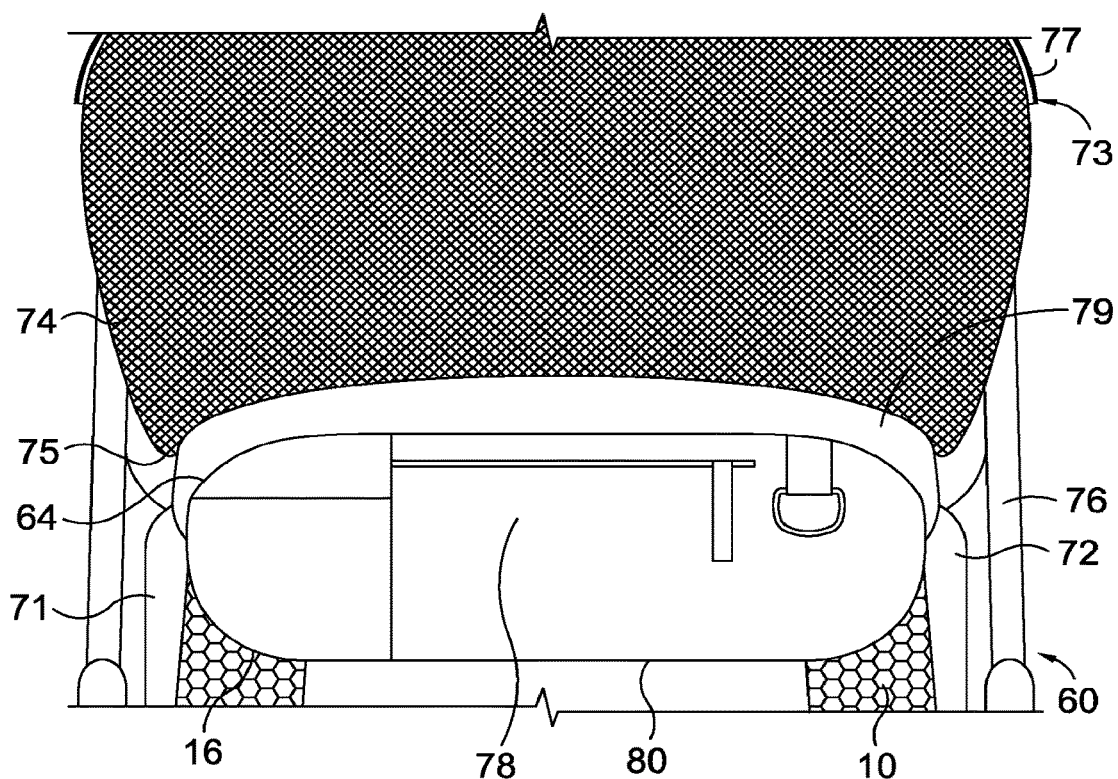
FIG. 7 is a front plan close-up view of an anchor member of the stroller from FIG. 6 in accordance with aspects of the disclosure.

FIGS. 6 and 7 depict cover members 10 and 74 in a deployed state, where FIG. 7 provides a close-up front view of anchor member 64 and portions of cover members 10 and 74. In example embodiments, both cover members 10 and 74 may be secured to anchor member 64 (e.g., bar member) of stroller 60. For example, cover member 10 may be secured to coupling element 66 on a bottom side 81 of anchor member 64, and second cover member 74 may extend from a top side 83 of anchor member as further described below. Securement of cover members 10 and 74 to anchor member 64 of stroller 60 maintains spacing of both cover members 10 and 74 from the child occupant without requiring rigid or semi-rigid structures to be incorporated into the actual covers.

As previously described, first cover member 10 may extend from anchor member 64 to bottom portion 70 of seat assembly 62. Additionally, second cover member 74 may extend from anchor member 64 to a canopy 85 of stroller 60. More particularly, second cover member 74 has a first end 75 that may be secured to anchor member 64 and a second end 73 opposite first end 75 and that may be secured to canopy 85. First end 75 of second cover member 74 includes a coupling element to secure second cover member 74 to anchor member 64 as further described below, and second end 73 of second cover member 74 includes a coupling element 77 for securing second end 73 of second cover member 74 to the child carrier. More particularly, coupling element 77 may secure second end 73 of second cover member 74 to a coupling element 82 residing on canopy 85 of stroller 60. Coupling elements 77 and 82 may be zippers, hooks, hook and loop, buttons, hook and loop tape, snaps or other removable securing elements to secure the second end 73 of second cover member 74 to stroller 60.

Figure 8:
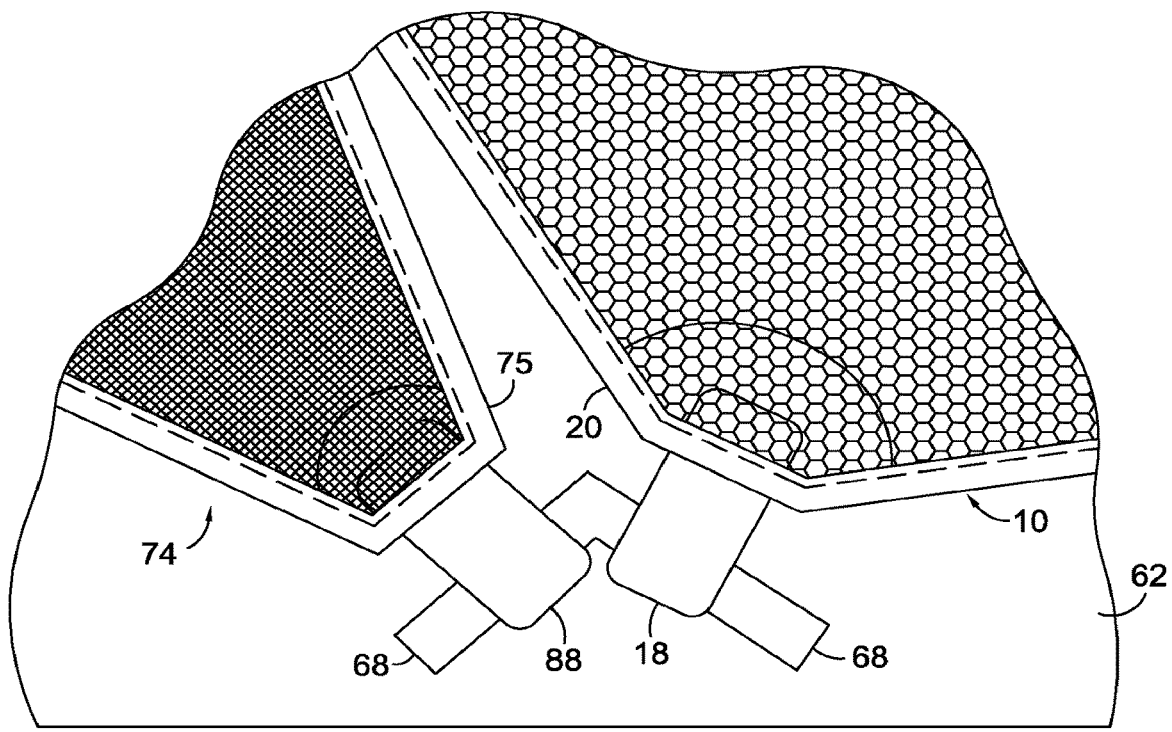
FIG. 8 is a close-up view of an exterior-facing side of attachment elements of a first cover member and a second cover member when they are secured to a stroller in accordance with aspects of the disclosure.
Figure 9:
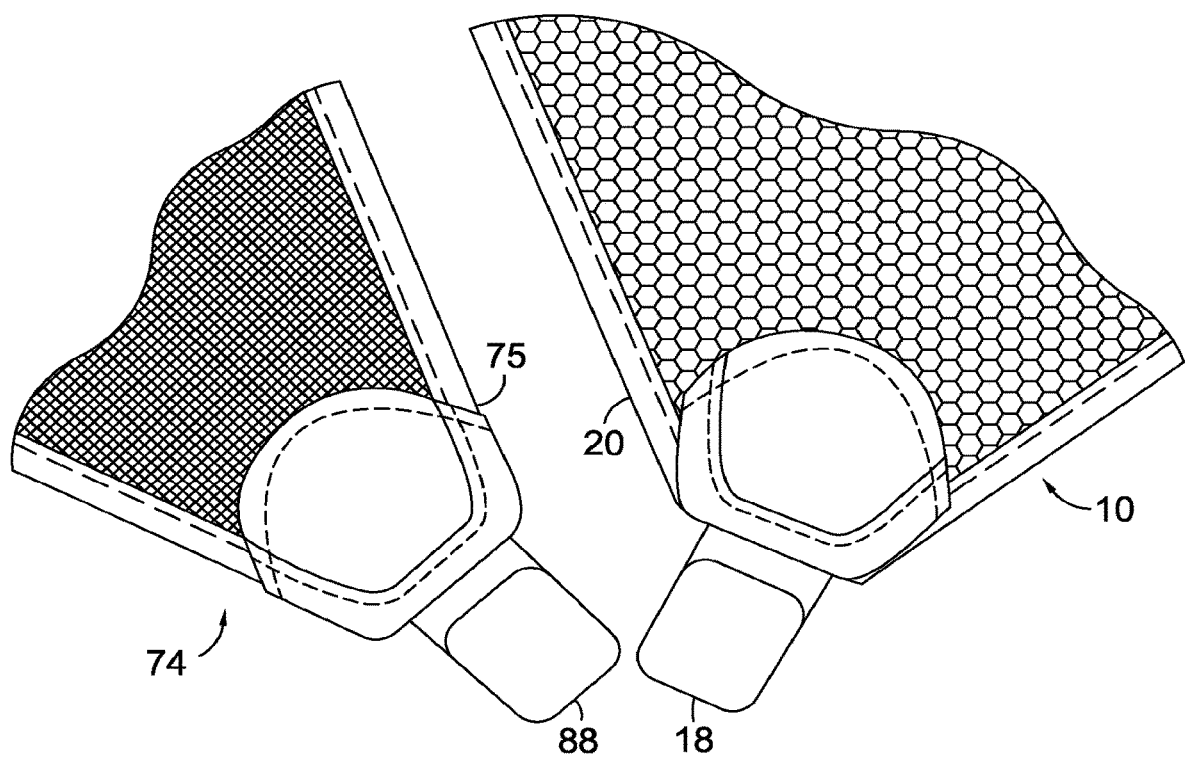
FIG. 9 is a close-up view of an interior-facing side the attachment elements of FIG. 8 in accordance with aspects of the disclosure.

With reference to FIG. 8 and FIG. 9, first end 75 of second cover member 74 may also include additional attachment elements 88 for securing second cover member 74 in addition to the disclosed coupling elements. Attachment elements 88 may be similar to attachment elements 18 of cover member 10 in that they secure cover member 74 to both sides 72 and 71 of a seat assembly 62. Attachment elements 88 may be hooks, hook and loop, buttons, snaps or other securing members to additionally secure first end 20 of cover member 74 to seat assembly 62. In the configuration of FIGS. 8 and 9, attachment element 18 of cover member 10 and attachment element 88 of second cover member 74 are hooks that attach to attachment elements 68, which are loops residing on sides (e.g., first side 72 and second side 71) of seat assembly 62 of stroller 60. Although FIG. 8 depicts attachment elements 68 that are configured to be secured to attachment element 18 and 88 as being a continuous structure, it should be understood that attachment elements 68 for coupling to separate attachment elements 18 and 88 may be separate as well.

Returning to FIG. 7, in some implementations, anchor member 64 (e.g., bar member) is at least partially enclosed by a fabric structure, such as fabric structure 80. Further, fabric structure 80 may include a pocket 79 with an opening to the pocket 79 on top side 83 of anchor member 64. Pocket 79 may be used to store a cover, such as second cover member 74, when not in use. In some implementations, first end 75 of second cover member 74 is permanently secured, such as through stitching, adhesive, bonding, and the like, to an interior surface of fabric structure 80 inside pocket 79. After second end 73 of second cover member 74 is unsecured from stroller 60, second cover member 74 may be rolled up and stored in pocket 79 of fabric structure 80. In other implementations, first end 75 of second cover member may be permanently or releasably secured to an exterior surface of fabric structure 80

Figure 10:
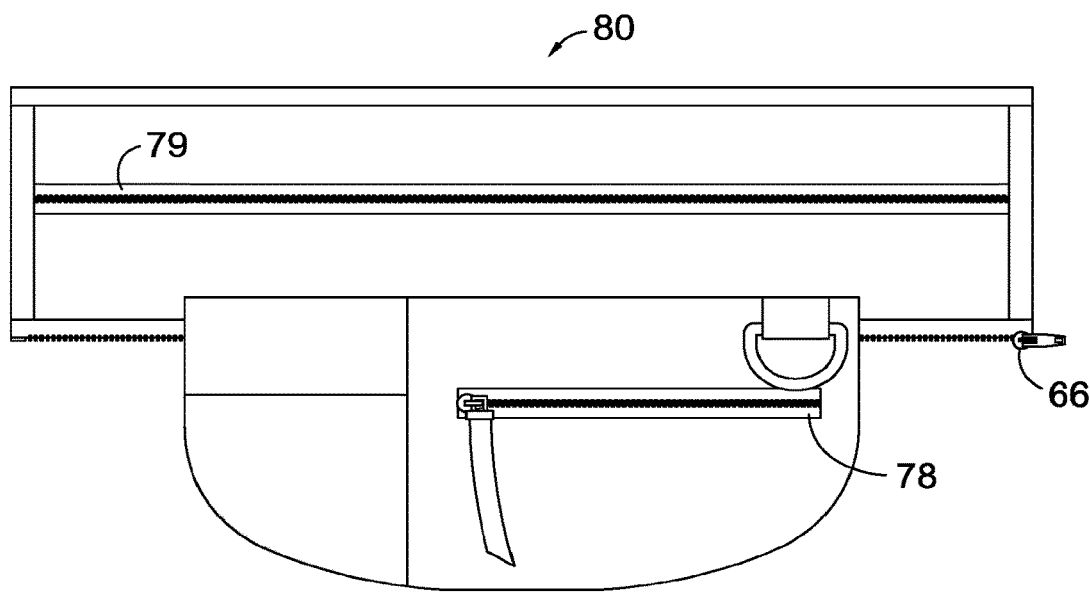
FIG. 10 is a front plan view of the fabric structure in accordance with aspects of the disclosure.
Figure 11:
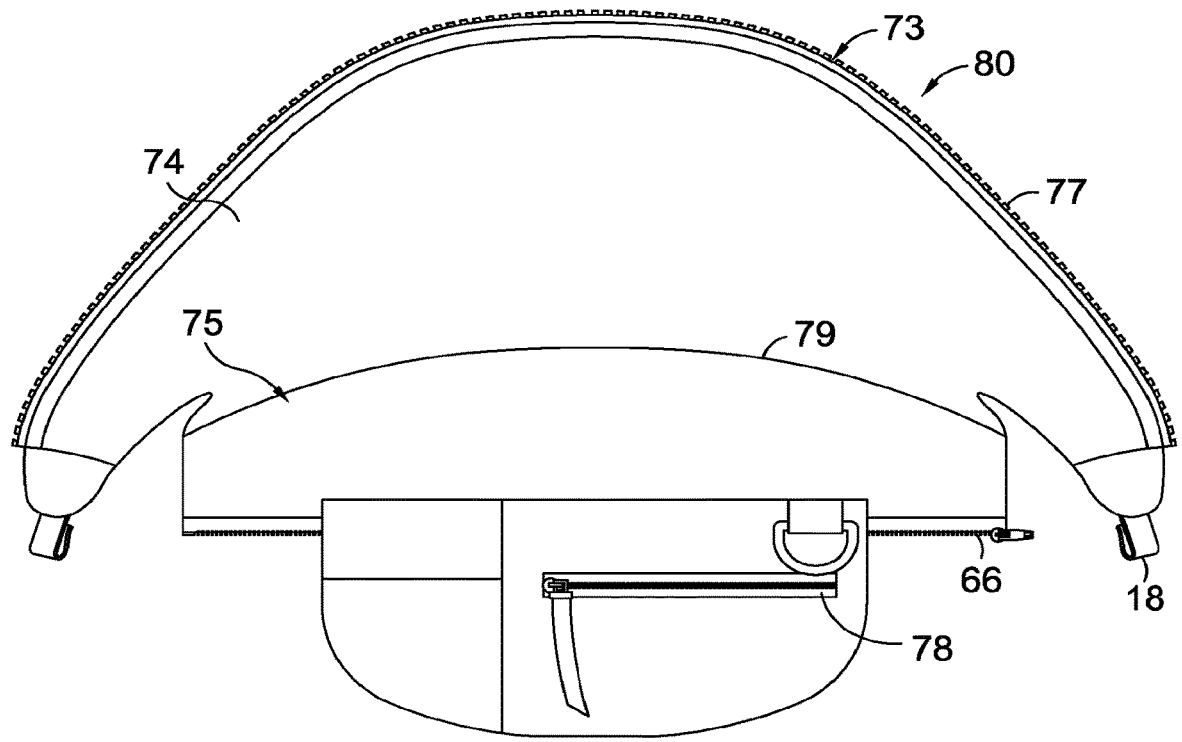
FIG. 11 is a front plan view of the fabric structure depicting the second cover member extending from the fabric structure in accordance with aspects of the disclosure.

FIG. 11 is a detailed view of the fabric structure 80. FIG. 10 depicts fabric structure 80 in a non-deployed position detached from anchor member 64. In this configuration, coupling element 66 to couple to cover member 10 is attached to fabric structure 80. Additionally, fabric structure 80 includes a second pocket 78, which may form part of a front side of fabric structure 80. Second pocket 78 may be used for storing cover member 10 when cover member 10 is detached and not in use. Additionally or alternatively, second pocket 78 may be used for storing personal items for an adult user and/or child occupant, such as keys, smart phones, pacifier, etc. FIG. 11 is an exploded view of the fabric structure 80 when not attached to a child carrier, such as stroller 60. FIG. 11 depicts second cover member 74 removed from pocket 79.

Different child carriers (e.g., car seat, stroller) have different structures to accommodate the carrier mode. For example, an infant car seat has a structure that is intended for a rear-facing installation in an automobile. A stroller has a structure that is intended for strolling or otherwise moving a child. Both examples of a child carrier provide the function of carrying a child, but each has completely different structures to accomplish the similar high-level goal. Having a cover member that is universally accepted between these very different child carriers (e.g., a child carrier of a first type, like a car seat, and a child carrier of a second type, like a stroller) reduces the number of part for the system, provide convenience for the universal applicability between child carriers, and can be effective for reducing costs of the system. As such, a cover member that can adapt to different child carrier having different structures while providing the coverage intended in both (or more) applications is helpful.

Many different arrangements of the various elements and components depicted, as well as components not shown, are possible without departing from the scope of the claims below. Implementations and configurations have been described with the intent to be illustrative rather than restrictive. Alternative implementations and configurations will become apparent to readers of this disclosure after and because of reading it. Alternative means of implementing the aforementioned can be completed without departing from the scope of the claims below.

What is claimed is:

1. A cover member removeably coupled with a child carrier, the cover member comprising:

a main panel having a first side, an opposite second side, a first end, and an opposite second end, the main panel formed from a first fabric;

a first side panel having an interior surface, an exterior surface, a first end, and an opposite second end, the first side panel extending from at least a portion of the main panel first side at a location that is more proximate the main panel first end than the main panel second end, the first side panel formed from a second fabric that is different from the first fabric;

a second side panel having an interior surface, an exterior surface, a first end, and an opposite second end, the second side panel extending from at least a portion of the main panel second side;

a coupling element extending continuously along at least a portion of the main panel first end, a portion of the first side panel first end, and a portion of the second side panel first end, wherein the coupling element is capable of removeably coupling with the child carrier; and a first attachment element extending from the first side panel more proximate the first side panel second end than the first panel first end.

2. The cover member of claim 1, wherein the first fabric does not include an elastane material.

3. The cover member of claim 1, wherein the first fabric has a lower stretch than the second fabric.

4. The cover member of claim 1, wherein the main panel is joined with the first side panel proximate the main panel first end and separable from the first side panel proximate the second end of the main panel.

5. The cover member of claim 1, wherein the first fabric is a non-mesh material and the second fabric is a mesh material.

6. The cover member of claim 1, wherein the first fabric has a first material characteristic and the second fabric has a second first material characteristic that is different from the first material characteristic.

7. The cover member of claim 1, wherein the coupling element is a zipper.

8. The cover member of claim 1, wherein the first attachment element extends away from the first side panel interior surface.

9. The cover member of claim 1 further comprising a second attachment element extending from the second side panel more proximate the second side panel second end than the second side panel first end.

10. The cover member of claim 9, wherein the first attachment element extends from the interior surface of the first side panel and the second attachment element extends from an interior surface of the second side panel.

11. The cover member of claim 9, further comprising a third attachment element extending from the first side panel and a fourth attachment element extending from the second side panel, wherein the third attachment element is more proximate the first end of the first side panel than the second end of the first side panel.

12. The cover member of claim 11, wherein the coupling element is spaced from the third attachment element by a distance in a range of 2 inches to 10 inches along the first side panel first end.

13. A removeably coupled cover member and child carrier system, the system comprising:
a child carrier capable of receiving a child occupant, the child carrier comprising an anchor member;
a cover member comprising:
a main panel having a first side, an opposite second side, a first end, and an opposite second end, the main panel formed from a first fabric;
a first side panel having an interior surface, an exterior surface, a first end, and an opposite second end, the first side panel extending from at least a portion of the main panel first side such that the main panel first end is more proximate the first side panel first end than the first side panel second end, the first side panel formed from a second fabric that is different from the first fabric;
a second side panel having an interior surface, an exterior surface, a first end, and an opposite second end, the second side panel extending from at least a portion of the main panel second side; and
a coupling element extending continuously along at least a portion of the main panel first end, a portion of the first side panel first end, and a portion of the second side panel first end, wherein the coupling element is capable of removeably coupling with the anchor member.

14. The system of claim 13, wherein the child carrier is an infant car seat.

15. The system of claim 14, wherein the anchor member is a canopy.

16. The system of claim 15, wherein the anchor member comprises a second coupling element capable of removeably coupling with the cover member coupling element.

17. The system of claim 13, further comprising a first attachment element extending from the first side panel proximate the first side panel second end, a second attachment element extending from proximate the second side panel second end, a third attachment element extending from proximate the first side panel first end, and a fourth attachment element extending proximate from the second side panel first end.

18. The system of claim 17, wherein the first attachment element, the second attachment element, the third attachment element, and the fourth attachment element are capable of removeably attaching to the child carrier.

19. The system of claim 18, wherein the first side panel is joined with the main panel proximate the main panel first end, and the first side panel is separable from the main panel proximate the main panel second end.

* * * * *